April 2, 1963  C. W. ATTWOOD  3,083,761
SCREENS
Filed Oct. 25, 1960  2 Sheets-Sheet 1
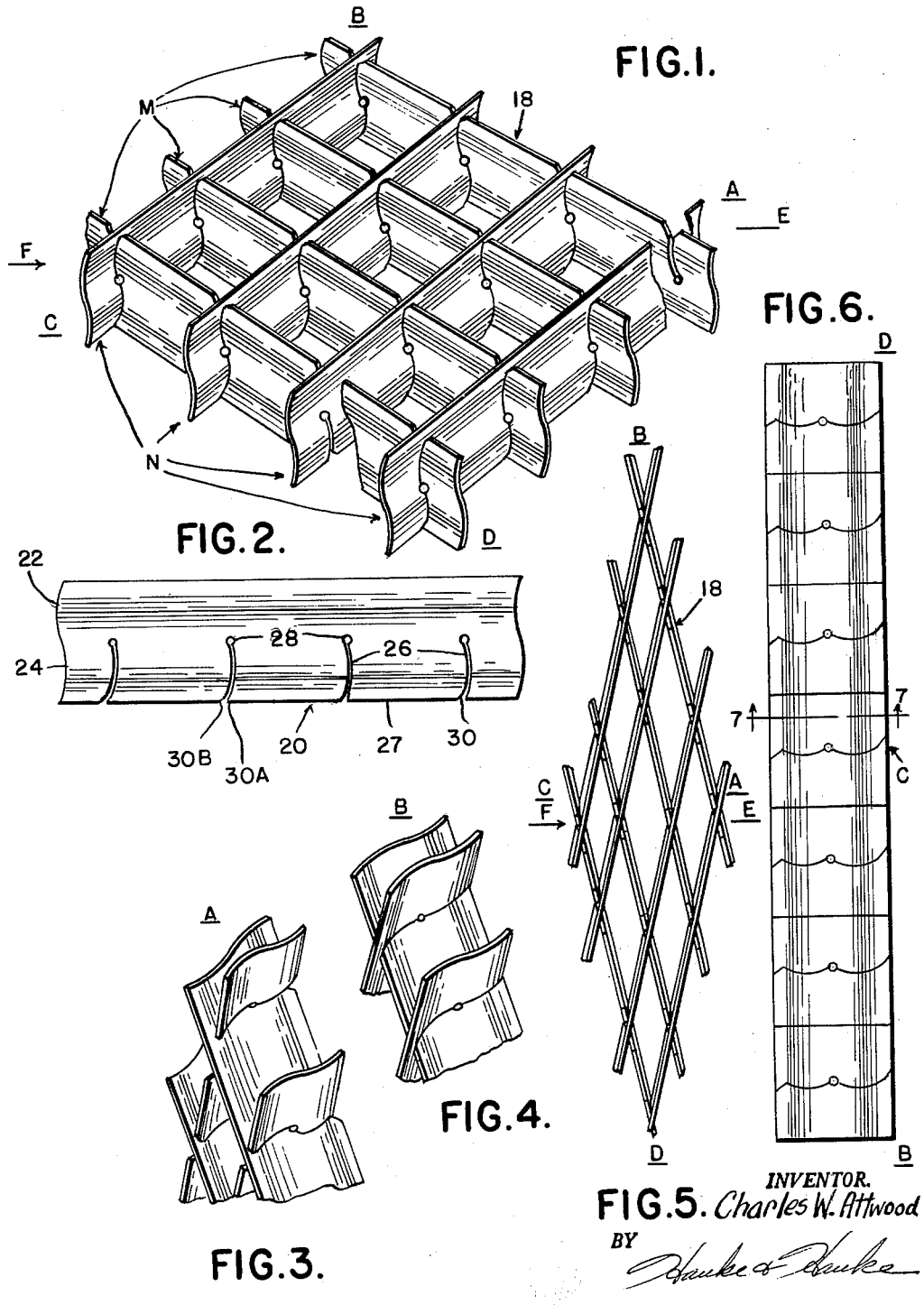
INVENTOR.
Charles W. Attwood
BY
ATTORNEYS April 2, 1963 C. W. ATTWOOD 3,083,761
SCREENS
Filed Oct. 25, 1960 2 Sheets-Sheet 2
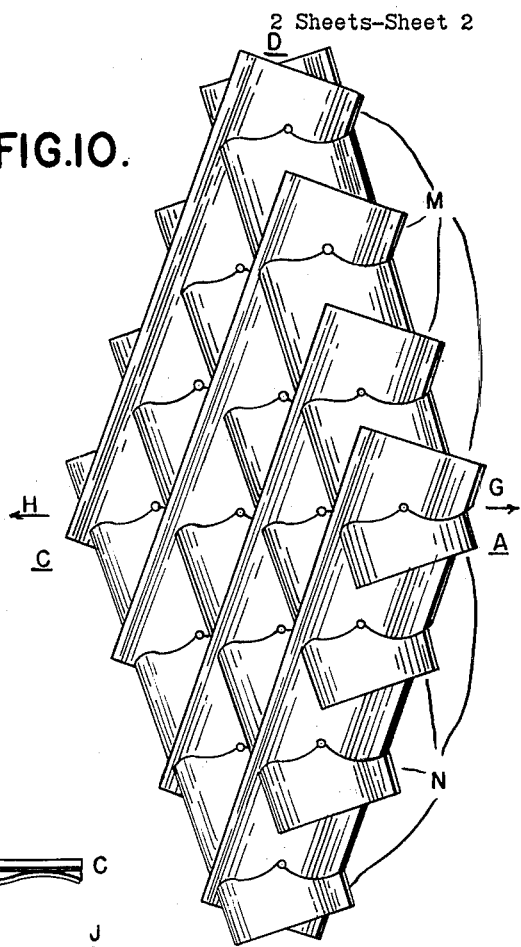
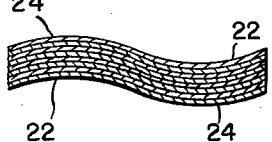
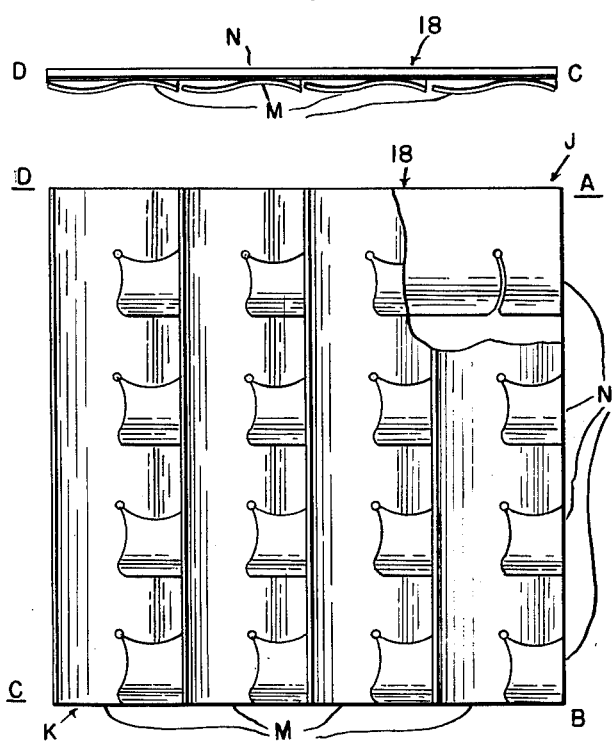
INVENTOR.
Charles W. Attwood
BY
ATTORNEYS United States Patent Office
3,083,761
Patented Apr. 2, 1963

3,083,761
SCREENS
Charles W. Attwood, 4077 2nd St., Wayne, Mich.
Filed Oct. 25, 1960, Ser. No. 64,968
5 Claims. (Cl. 160—136)

The present invention relates to screens and more particularly to a multiple purpose screen adapted for optional use as an open screen through which light and air may pass or as a solid screen or panel which is relatively impervious to light and air.

In the present day construction of buildings, speed and ease of erection and finishing are of prime importance. Moreover many buildings are today designed for multiple purpose uses. For instance, the same building may contain office, storage, fabrication, assembly, laboratory and other types of space. Furthermore, once erected and finished, it may become necessary to rearrange and expand or reduce the space allotted to each purpose with a minimum of time and effort. As a consequence, it has become most important to provide screens or space dividers, both wall and ceiling, which are attractive, long lasting, readily mounted and demounted, light weight, adaptable to multiple uses, sturdy, and which require little or no decorative or other finishing and maintenance.

Few presently used screens serve more than one or two of these needs. Lath and plaster, for instance, is heavy, permanent and requires expensive decorative finishing. Dry wall or gypsum board has the same disadvantages. The same can be said for wood paneling. Glass brick or panels are heavy, limited in their uses and are not readily shifted as space requirements change, while cloth and plastic are not sturdy, easily maintained or long lasting.

While the present screen is particularly useful as a space divider in a wall or ceiling, its adaptation is obviously not limited to such use nor are its features of novelty limited to use in such installations. For example, as will appear later due to its open character, in one arrangement thereof, it is eminently useful as a guard, reflector and diffuser for light sources such as florescent light tubes. Also it may find use in air duct outlets or simply as a decorative screen.

It is therefore an object of this invention to provide a screen that may be adapted to a multiplicity of uses. Another object is to provide a novel screen adapted for arrangement optionally for use as an open screen through which light and air may pass or as a solid screen that is relatively impervious to light and air.

Another object is to provide a screen that may be collapsed for easy and economical storing and shipping but when expanded will automatically have structural rigidity and strength.

Still another object is to provide a screen which though sturdy, long lasting and easily installed and removed from place, is attractive, light weight, adapted to many uses and which requires no decorative or other finishing or maintenance.

A further object of the present invention is to provide a screen which is usable as an open or solid space divider and also as a guard through which light and air may pass.

These and other objects and advantages of the present invention will be apparent from the following detailed description and accompanying drawings in which:

FIG. 1 is a perspective view of a screen of the present invention in open expanded arrangement.

FIG. 2 is an elevation of one of the slats of which the present screen is constructed.

FIG. 3 is a fragmentary perspective view of the right corner of the screen shown in FIG. 1.

FIG. 4 is a fragmentary perspective view of the far corner of the screen shown in FIG. 1.

FIG. 5 is a plan view of the screen shown in FIG. 1 in partially collapsed open condition.

FIG. 6 is an elevation of the present screen shown in collapsed condition.

FIG. 7 is an enlarged cross sectional view taken along the line 7—7 of FIG. 6.

FIG. 8 is a plan view of the screen of the present invention in closed expanded arrangement, certain parts being broken away.

FIG. 9 is a left side elevational view of the screen as shown and arranged in FIG. 8.

FIG. 10 is a plan view of the screen as shown and arranged in FIG. 8 in partially expanded condition.

The screen 18 of the present invention consists of a plurality of similar slats 20 (FIG. 2), preferably formed from a thin relatively stiff, resilient material; for example, stainless steel, or other metals or plastics having such physical properties. Each slat 20 is S-shaped in transverse cross section (see FIG. 7) and of uniform thickness throughout its length, having a curved half 22 (FIG. 2) and a reversely curved half 24.

The reversely curved half 24 (FIG. 2) is provided at preferably equal intervals throughout its length with slits 26 which open on the longitudinal margin 27 of the slat half 24 and extend inwardly to points near the center of the slat 20 where they terminate in stress relieving apertures 28. At the margin 27 the slits 26 are widened to form a recess 30 to make assembly of the slats easier. Also, for easier assembly, the corner 30A of the recess 30 is preferably bent a small amount outwardly and the corner 30B is preferably bent a small amount inwardly.

The slits 26 are all similarly curved, their radii closely approximating the radius of the curved half 22 of said slat 20.

To assemble the screen 18 from a plurality of said slats 20, any desired number of the slats 20, hereinafter called a course or set M (FIG. 1) may be arranged in parallel relation with their slits 26 in alignment, each slat being spaced from its adjacent slat the distance between adjacent slits 26 in each slat. Another course or set N of slats 20 is then locked to the first course M by aligning the slit mouths 30 of each slat in course N with aligned slit mouths of the slats in course M and pushing the respective slats together. Care should be taken in performing the assembly operation that the recesses 30 of each course M and N are aligned and that the slats 20 of each course are similarly orbited so that the curved slits 26 of each course face in the same direction and will thus closely receive the curved portion 22 of the slats in the other course after assembly. Should the slats of the courses M and N be reversely oriented upon assembly the curve of the slits 26 of one course will not mate with the then reversely presented curved portion 22 of the slats in the other course causing binding and bending of the slats and in fact making assembly impossible.

When the slats 20 have been properly assembled as described above, they will form the open expanded screen 18, shown in FIG. 1, having four different corners A, B, C, and D. The screen 18 may be collapsed by pushing inwardly on the corners A and C in the direction of the arrows E and F (FIG. 1), whereupon it will snap into the collapsed condition shown in FIGS. 6 and 7. As mentioned in the drawing description, FIG. 5 shows the screen 18 in a partially collapsed open condition. If instead of the corners A and C the corners B and D are pushed inwardly the assembled slats 20 will bind and the screen will not assume the fully collapsed condition shown in FIG. 6, since the slats of the two courses M and N must assume nesting positions alternately for proper collapse.

To expand the collapsed screen 18 to its open expanded arrangement the corners A and C are grasped and pulled in opposite directions, at right angles to the broad face of the slats and opposite to the directions indicated by the arrows E and F (FIG. 5) whereupon the screen 18 will snap into said arrangement as shown in FIG. 1.

To place the screen 18 in its closed expanded arrangement (FIGS. 8 and 9) it should first be collapsed as shown in FIGS. 6 and 7. The corners A and C should then be grasped and pulled sidewise, in opposite directions, as shown by arrows G and H (FIG. 10), whereupon the slats 20 of the one course M will turn relative to the slats of the other course N until the courses M and N are at right angles to each other as shown in FIG. 8. During this unfolding process the slats 20 in each course remain parallel to each other as shown in FIG. 10 and the slats are held locked together by the resiliency of the slats and their curved configuration. Such is also the case when the screen 18 reaches its closed expanded arrangement (FIG. 8) and it will remain in this condition until collapsed by pushing in the direction of the arrows J and K (FIG. 8) whereupon it will resume its collapsed condition shown in FIGURE 6.

Once assembled the screen 18 is readily collapsed by pushing on the corners A and C (FIG. 1) as previously described, whereupon it assumes the collapsed and compact shape shown in FIGURES 6 and 7. In this condition it may be transported without fear of its becoming disassembled and its flattened, compact shape makes it extremely easy to store, handle, and package for shipment to the place of its installation.

When the screen 18 is to be installed as a flat wall panel or other space divider, it can be carried in its collapsed condition directly to its place of installation where it can be unfolded to its closed expanded arrangement (FIG. 8), as previously described, and fastened in place by moldings, special fasteners, nails, screws or the like. In such arrangement it makes a pleasing appearing wall or ceiling the design of which may be varied by a random, regular or patterned orientation of the individual screens 18.

When the screen is to be installed as a guard for a lighting fixture or as sections of an open ceiling panel or space divider it can be similarly transported to its place of installation in its collapsed condition where it can then be expanded to its open expanded arrangement, previously described, for placement in its ultimate surroundings. As in the case of the closed expanded arrangement this placement may be by any desired means, such as moldings, hooks or any appropriate type of hanger. In fact, since the slats of one course retain the slats of the other course positively in place because of the complimentary curved contours of the slits with the slats, the screen is readily held in place by a minimum number of fasteners.

As will be apparent from the above description, whenever it is desired to demount the screen from its installation, its fasteners can be removed and the screen quickly collapsed, whereupon it is ready for storage or immediate mounting elsewhere in either of its two expanded arrangements, i.e. open or closed.

While I have described a preferred embodiment of the present invention, it will be understood that various changes and modification may be made in the details thereof without departing from the spirit of the invention and scope of the appended claims.

I claim:

1. A screen comprising first and second courses of slats each having a substantially S-shaped curved contour in transverse cross-section, the slats of each course having slits therein that open on a longitudinal margin of said slats, said slits of each course receiving and engaged with the slats of the other course, said slits being curved to coincide with the portions of the slats in said other course which are received by said slits.

2. The screen of claim 1 in which said slats are formed from a stiff, resilient material.

3. The screen as defined in claim 1 and in which the slats of one course are similar to and interchangeable with each other and with the slats of the other course.

4. The screen as defined in claim 1 and in which each slat contour has uniform and equal arcs from the longitudinal edges to the center of the slat.

5. The screen as defined in claim 2 and in which the inner end of each slit has a stress relieving aperture.

References Cited in the file of this patent
UNITED STATES PATENTS

| | | |
|---|---|---|
| 240,141 | Jaeger | Apr. 12, 1881 |
| 2,620,869 | Friedman | Dec. 9, 1952 |

FOREIGN PATENTS

| | | |
|---|---|---|
| 520,220 | Canada | Jan. 3, 1956 |